N. S. COLE.
SEED SAVING ATTACHMENT FOR MOWERS.
APPLICATION FILED SEPT. 15, 1917.
1,253,153.
Patented Jan. 8, 1918.
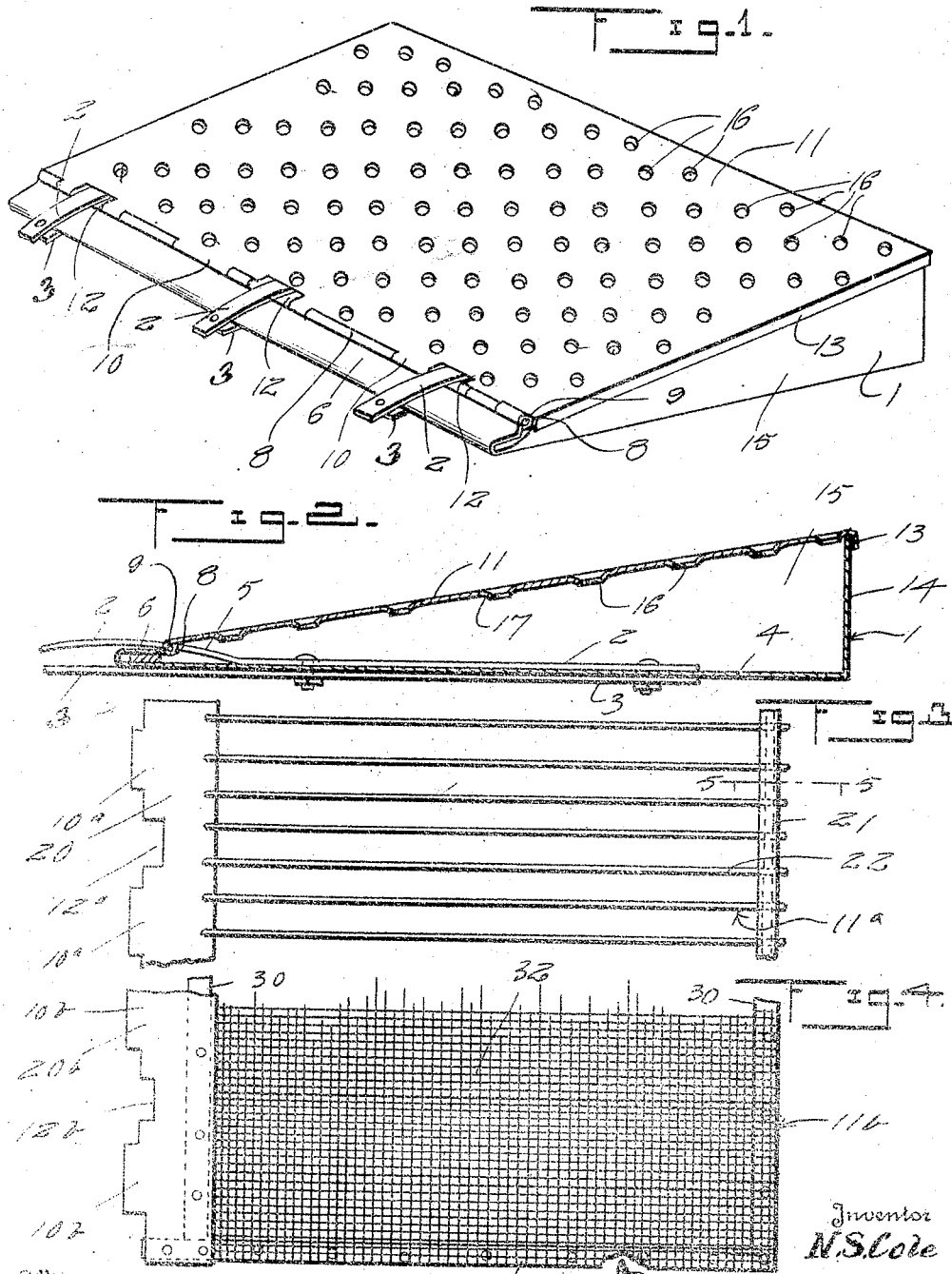
Inventor
N. S. Cole

UNITED STATES PATENT OFFICE.

NOEL S. COLE, OF NEWBERN, TENNESSEE.

SEED-SAVING ATTACHMENT FOR MOWERS.

1,253,153.  Specification of Letters Patent.  Patented Jan. 8, 1918.

Application filed September 15, 1917. Serial No. 191,561.

*To all whom it may concern:*

Be it known that I, NOEL S. COLE, a citizen of the United States, residing at Newbern, in the county of Dyer and State of Tennessee, have invented certain new and useful Improvements in Seed-Saving Attachments for Mowers; and I do hereby declare the following to be a full, clear, and exact description of the invention, such as will enable others skilled in the art to which it appertains to make and use the same.

This invention relates to an attachment for mowing machines, which is particularly designed for saving the seed of various types of hay or forage, which might be cut by the mower, and the primary object of the invention is to provide a retaining pan which is connected to the cutter bar structure of a mowing machine of ordinary construction and has a hinged cover connected thereto which extends upwardly and rearwardly from the cutter bar, and is provided with a plurality of openings, through which the seed scattered from the heads of the hay or forage pass into the retaining body of the receptacle, from which the seeds may be removed when desired.

A further object of this invention is to improve the construction of the seed saving attachment illustrated in Letters Patent #1,233,984 by providing a plurality of interchangeable hinged tops for the receptacle which are constructed for use in saving the seeds of various types of hay, also to hingedly connect the covers or tops of the receptacle to the lower rearwardly bent edge of the bottom of the receptacle, so that the cover may be moved upwardly over the mowing machine cutter bar to permit of the easy and convenient removal of the seed from the receptacle.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a perspective view of the improved seed saving attachment,

Fig. 2 is a sectional view through the attachment,

Fig. 3 is a fragmentary plan of a modified form of the cover for the receptacle, Fig. 4 is a fragmentary plan of a second modified form of the receptacle, and Fig. 5 is a fragmentary section on the line 5—5 of Fig. 3.

Referring more particularly to the drawings, 1 designates the seed receiving and retaining receptacle of the seed saving attachment, which body is constructed of sheet metal or analogous material and has attaching bars 2 and 3 secured to the inner and under surface of the bottom 4 respectively, of the receptacle, and projecting beyond the forward edge of the same for detachable connection with the cutter bar of an ordinary mowing machine. The bars 2 which are attached to the upper surface of the bottom 4 of the body are bent upwardly as shown at 5, so that they extend over the forward edge of the body and lie in spaced relation to the forward ends of the bars 3, as clearly shown in Figs. 1 and 2 of the drawings.

The forward edge of the bottom 4 of the body is bent back upon itself as shown at 6, and it is reinforced by a bar 7 which extends across the forward end of the body and is positioned between the upper and lower portions of the forward edge as clearly shown in Fig. 2 of the drawings. The forward rearwardly curved edge 6 of the bottom 4 has tongues 8 formed thereon which are rolled to form barrels through which the hinge pin 9 extends. The hinge pin 9 also extends through rolled tongues 10 which are formed upon the lower edge of the cover 11. The cover 11 is provided with cut out portions 12 which permit the forward ends of the bars 2 to project therethrough and also permit the unimpeded pivotal or swinging movement of the cover 11 with respect to the body 1 and the bars 2. The cover 11 has its rear edge and ends bent downwardly as shown at 13 for overhanging the upper edges of the rear walls 14 and ends 15 of the body 1. The upper edges of the end walls 15 incline, as clearly shown in the drawings so that the cover 11 extends upwardly and rearwardly from the mowing machine cutter bar.

The cover 11 is provided with a plurality of openings 16 which are disposed in staggered relation to each other and the portions of the cover surrounding the openings 16 are bent inwardly as shown at 17 so as to properly guide the seed downwardly through the openings into the receptacle or body 1.

In Figs. 3 and 5 a modified form of the cover is shown, and this modified form of the cover comprises a forward strip 20 and a rear strip 21 which are constructed of sheet metal and are connected by a plurality of spaced rods 22. The cover 11ª is provided for use in connection with the body 1 when a certain type of hay or forage is being cut by the mowing machine, so as to allow larger seed heads to pass into the receptacle. The bar 20 is provided with tongues 10ª which correspond to the tongues 10 and receive the hinge pin 9 for connecting the modified form of cover 11ª to the body. The rear or upper strip 21 is substantially U-shaped in cross section and is provided with a plurality of spaced openings 23 through which the ends of the spaced rods 22 extend. The rods 22 are bent about the lower edge of the strip 21 for securely connecting the rods to the rear strip, as clearly shown at 24 in Fig. 5 of the drawings.

Fig. 4 of the drawings shows a further modified form of the cover, which modification is indicated by the numeral 11ᵇ. The modified cover 11ᵇ comprises a frame 30, which has a plate 20ᵇ connected thereto that corresponds to the plate 20 and has tongues 10ᵇ formed thereon for receiving the hinge pin 9.

The plate or strip 20 and the plate or strip 20ᵇ are provided with recesses 12ª and 12ᵇ respectively which receive the forward ends of the bars 2. The strip 20ᵇ is attached to one edge of the frame 30, and this frame is substantially rectangular in shape, being provided for resting upon the upper edge of the body 1. A screen 32, of any desired mesh is attached to the frame 30 and extends over the entire surface of the modified form of the cover 11ᵇ for permitting the fine seeds to fall therethrough into the receptacle when this modification of the cover is employed.

In reducing the invention to practice, certain minor features of construction, combination and arrangement of parts may necessitate alterations to which the patentee is entitled, provided such alterations are comprehended within the scope of what is claimed.

What is claimed is:—

1. A seed saving attachment for mowing machines comprising a receptacle having a bottom, a plurality of bars attached to the upper and lower surfaces of said bottom and having their forward ends spaced for engagement with an ordinary mowing machine cutter bar, the forward edge of the bottom of said receptacle being bent back upon itself, a supporting bar positioned between the backwardly bent portion of the forward edge of said body and the upper surface of the body, and a perforated cover hingedly connected to said backwardly bent forward edge.

2. A seed saving attachment for mowing machines comprising a receptacle having a bottom, means carried by said receptacle for connecting the receptacle to an ordinary mowing machine cutter bar, the forward edge of the bottom of said receptacle being bent backwardly upon itself, a bar positioned between the backwardly bent portion of said forward edge and the bottom of the receptacle, a plurality of tongues formed upon said backwardly bent edge and rolled to form hinge barrels, a cover, a plurality of tongues formed upon said cover and rolled to form hinge barrels, and a hinge pin extending through said rolled tongues for hingedly connecting said cover to said bottom, said cover extending upwardly and rearwardly from its hinged connection to said bottom and being provided with a plurality of openings to allow seed to fall through the cover into the receptacle.

3. A seed saving attachment for mowing machines, comprising a receptacle having a bottom, a plurality of bars attached to the upper and lower surfaces of said bottom and having their forward ends projecting beyond the forward edge of the bottom and positioned in spaced relation to each other for detachable connection with an ordinary mowing machine cutter bar, the forward edge of the bottom of said body being bent back upon itself, a bar positioned between said backwardly bent portion of the forward edge and the upper surface of the body, a plurality of tongues formed upon said backwardly bent edge and being rolled to form hinge barrels, a cover for said receptacle, a plurality of tongues formed upon the lower edge of said cover and rolled to form hinge barrels, a hinge pin extending through said rolled tongues and pivotally connecting said cover to said receptacle, said cover provided with a plurality of openings to permit certain of said body carried bars to project therethrough, said cover further provided with a plurality of openings to permit seeds to fall therethrough into said receptacle.

In testimony whereof I affix my signature in presence of two witnesses.

NOEL S. COLE.

Witnesses:
S. N. HALL,
C. E. SCOBY.